United States Patent
Smith, Sr.

(10) Patent No.: US 6,871,787 B1
(45) Date of Patent: Mar. 29, 2005

(54) DATA STORAGE CARD HAVING A GLASS SUBSTRATE AND DATA SURFACE REGION AND METHOD FOR USING SAME

(75) Inventor: Malcolm G. Smith, Sr., Muleqe (MX)

(73) Assignee: UltraCard, Inc., Bend, OR (US)

( * ) Notice: Subject to any disclaimer, the term of this patent is extended or adjusted under 35 U.S.C. 154(b) by 78 days.

(21) Appl. No.: 09/663,658

(22) Filed: Sep. 15, 2000

Related U.S. Application Data (63) Continuation-in-part of application No. 09/113,783, filed on Jul. 10, 1998, now Pat. No. 6,131,816.

(51) Int. Cl.$^7$ .......................... G06K 13/00; G06K 7/08; G06K 7/00
(52) U.S. Cl. ...................... 235/475; 235/449; 235/486
(58) Field of Search ................................ 235/449, 486, 235/475, 439, 487, 493

(56) References Cited

U.S. PATENT DOCUMENTS

| | | | |
|---|---|---|---|
| 1,756,547 A | | 4/1930 | Hansen |
| 3,677,843 A | | 7/1972 | Reiss |
| 3,838,252 A | | 9/1974 | Hynes et al. ........ 235/61.12 M |
| 3,864,755 A | | 2/1975 | Hargis |
| 3,976,858 A | * | 8/1976 | Haun .......................... 235/482 |
| 4,006,507 A | * | 2/1977 | Yoshida ........................ 15/102 |
| 4,040,097 A | * | 8/1977 | Mizuno .......................... 360/2 |
| 4,058,839 A | | 11/1977 | Darjany |
| 4,076,125 A | | 2/1978 | Ohsaki et al. |
| 4,100,689 A | | 7/1978 | Broune |
| 4,104,682 A | | 8/1978 | Lehner et al. |
| 4,141,400 A | | 2/1979 | Mangan |
| 4,197,988 A | | 4/1980 | Moss et al. |
| 4,209,811 A | | 6/1980 | Blazevic |
| 4,277,809 A | | 7/1981 | Fisher et al. |
| 4,302,523 A | | 11/1981 | Audran et al. |

(Continued)

FOREIGN PATENT DOCUMENTS

| | | | |
|---|---|---|---|
| EP | 0194675 | 9/1986 | ............ G11B/5/71 |
| FR | 2505523 | 12/1982 | |
| JP | 10041118 | 4/1998 | |
| JP | 10144391 A | 5/1998 | |
| WO | WO 9210485 | 12/1992 | |

OTHER PUBLICATIONS (One Page) Advertising Brochure, Iomega Clik! PC Card Drive (40 MB Disk) Iomega Corporation, 1999.

Gooch et al. "A High Resolution Flying Magnetic Disk Recording System With Zero Reproduce Spacing Loss" pp. 4545–4554, IEEE Transactions on Magnetis, vol. 27, No. 6, Nov. 1991.

One (1) Page Advertising Brochure, SysTECH, Wallet Size CDROM, Copyright 1999.

Three (3) Pages/Gold CD Mini ROM (Picture), Back/Front Packaging for CD Mini ROM AOL, America On Line.

*Primary Examiner*—Karl D. Frech
*Assistant Examiner*—April A. Taylor
(74) *Attorney, Agent, or Firm*—Bever, Hoffman & Harms, LLP

(57) ABSTRACT

A data card is shown. The data card includes a non-magnetic substrate selected from the group consisting of a glass substrate, a glass-ceramic substrate, crystallized glass substrate, an aluminum substrate, a ceramic substrate, a carbon substrate, a silicon substrate and a resin substrate, which substrate, in the preferred embodiment, has a first edge and second edge. A data storage surface region is located on the substrate between the first edge and the second edges. The data surface region includes a magnetic storage medium. A data unit having a combination of a data card and a data card reader is also shown. A method for reading a data storage card is also shown.

17 Claims, 7 Drawing Sheets

U.S. PATENT DOCUMENTS

| | | | |
|---|---|---|---|
| 4,318,136 A | 3/1982 | Jeffers | |
| D264,853 S | 6/1982 | Scavino et al. | |
| 4,403,138 A | 9/1983 | Battarel et al. | |
| 4,450,955 A | 5/1984 | Featherston | |
| 4,503,125 A | 3/1985 | Nelson et al. | |
| 4,518,627 A | 5/1985 | Foley et al. | |
| 4,529,872 A * | 7/1985 | Dinges | 235/482 |
| 4,530,016 A | 7/1985 | Sawazaki | |
| 4,535,369 A | 8/1985 | Sawazaki | |
| 4,581,523 A | 4/1986 | Okuno | |
| 4,585,929 A | 4/1986 | Brown et al. | |
| 4,592,042 A | 5/1986 | Lemelson et al. | |
| 4,598,196 A | 7/1986 | Pierce et al. | |
| 4,609,812 A | 9/1986 | Drexler | |
| 4,612,436 A | 9/1986 | Okada | |
| 4,620,727 A | 11/1986 | Stockburger et al. | |
| 4,659,915 A | 4/1987 | Flies | |
| 4,672,182 A * | 6/1987 | Hirokawa | 235/436 |
| 4,683,371 A | 7/1987 | Drexler | |
| 4,687,712 A | 8/1987 | Sugita et al. | |
| 4,701,601 A | 10/1987 | Francini et al. | |
| 4,707,593 A | 11/1987 | Murata et al. | |
| D293,694 S | 1/1988 | Alden et al. | |
| 4,718,697 A | 1/1988 | Berardus van Amelsfort | |
| 4,731,645 A | 3/1988 | Parmentier et al. | |
| 4,754,128 A | 6/1988 | Takeda et al. | |
| 4,756,967 A * | 7/1988 | Hashimoto et al. | 427/131 |
| 4,774,618 A | 9/1988 | Raviv | |
| 4,777,540 A | 10/1988 | McCoy | |
| 4,780,604 A | 10/1988 | Hasegawa et al. | |
| 4,786,564 A | 11/1988 | Chen et al. | |
| 4,791,283 A | 12/1988 | Burkhardt | |
| 4,812,633 A | 3/1989 | Vogelgesang et al. | |
| 4,826,772 A | 5/1989 | Meathrel | |
| 4,833,310 A | 5/1989 | Shimamura et al. | |
| 4,851,610 A | 7/1989 | LeBlanc et al. | |
| 4,868,373 A | 9/1989 | Opheij et al. | |
| 4,877,488 A | 10/1989 | Cody et al. | |
| 4,889,755 A | 12/1989 | Charbonneau | |
| 4,897,533 A | 1/1990 | Lyszczarz | |
| D305,887 S | 2/1990 | Nishimura | |
| 4,931,623 A | 6/1990 | Nakamura et al. | |
| 4,937,438 A | 6/1990 | Warwick et al. | |
| 4,978,401 A | 12/1990 | Bonomi | |
| 4,998,009 A | 3/1991 | Iijima et al. | |
| 5,036,430 A | 7/1991 | Hills | |
| 5,041,922 A | 8/1991 | Wood et al. | |
| 5,049,728 A | 9/1991 | Rovin | |
| 5,055,155 A | 10/1991 | Crotty et al. | |
| 5,099,111 A | 3/1992 | Takakura et al. | |
| 5,099,372 A | 3/1992 | Kadokura et al. | |
| 5,101,097 A | 3/1992 | Conant | |
| 5,107,099 A | 4/1992 | Smith | |
| D328,457 S | 8/1992 | Matsuzaka | |
| 5,147,732 A | 9/1992 | Shiroishi et al. | |
| 5,172,282 A | 12/1992 | Ghose | |
| 5,180,640 A | 1/1993 | Yamashita et al. | |
| 5,191,198 A | 3/1993 | Do | |
| 5,204,513 A | 4/1993 | Steele | |
| 5,206,489 A | 4/1993 | Warwick | |
| 5,206,494 A | 4/1993 | Metzger | |
| 5,217,056 A | 6/1993 | Ritter | |
| 5,221,838 A | 6/1993 | Gutman et al. | |
| 5,227,212 A | 7/1993 | Ahlert et al. | |
| 5,236,791 A * | 8/1993 | Yahisa et al. | 428/611 |
| 5,254,843 A | 10/1993 | Hynes et al. | |
| 5,270,523 A | 12/1993 | Chang et al. | |
| 5,286,958 A | 2/1994 | Smeets | |
| 5,288,942 A | 2/1994 | Godfrey | |
| 5,309,388 A | 5/1994 | Maruyama et al. | |
| 5,311,003 A | 5/1994 | Saroya | |
| 5,321,243 A | 6/1994 | Groves et al. | |
| 5,336,871 A | 8/1994 | Colgate, Jr. | |
| 5,362,952 A | 11/1994 | Nair et al. | |
| 5,396,369 A | 3/1995 | Deland, Jr. et al. | |
| 5,396,545 A | 3/1995 | Nair et al. | |
| 5,397,886 A | 3/1995 | Mos et al. | |
| 5,408,384 A | 4/1995 | Gannyo et al. | |
| 5,410,136 A | 4/1995 | McIntire et al. | |
| 5,421,618 A | 6/1995 | Okazaki et al. | |
| 5,426,286 A | 6/1995 | Nair et al. | |
| 5,428,213 A | 6/1995 | Kurihara | |
| 5,431,746 A | 7/1995 | Manning et al. | |
| 5,452,143 A | 9/1995 | Kamagami | |
| 5,466,918 A | 11/1995 | Ray et al. | |
| 5,480,685 A | 1/1996 | Suzuki et al. | |
| 5,492,745 A | 2/1996 | Yokoyama | |
| 5,509,083 A | 4/1996 | Abtahi et al. | |
| 5,521,774 A | 5/1996 | Parks et al. | |
| 5,530,232 A | 6/1996 | Taylor | |
| 5,535,078 A | 7/1996 | Warwick | |
| 5,557,089 A | 9/1996 | Hall et al. | |
| 5,559,885 A | 9/1996 | Drexler et al. | |
| 5,588,763 A | 12/1996 | Nubson et al. | |
| 5,598,474 A | 1/1997 | Johnson | |
| 5,609,253 A | 3/1997 | Goade, Sr. | |
| 5,612,526 A | 3/1997 | Oguchi et al. | |
| 5,621,583 A | 4/1997 | Parks et al. | |
| 5,626,970 A | 5/1997 | Hedgcoth | |
| 5,637,174 A | 6/1997 | Field et al. | |
| 5,638,345 A * | 6/1997 | Hosoya | 369/30.1 |
| 5,679,942 A | 10/1997 | Toyama | |
| 5,679,945 A | 10/1997 | Renner et al. | |
| 5,689,105 A * | 11/1997 | Mizoguchi et al. | 235/475 |
| 5,696,369 A | 12/1997 | Watanabe | |
| 5,698,839 A | 12/1997 | Jagielinski | |
| 5,713,406 A | 2/1998 | Drury | |
| 5,714,747 A | 2/1998 | West et al. | |
| 5,720,500 A | 2/1998 | Okazaki et al. | |
| 5,723,033 A | 3/1998 | Weiss | |
| 5,734,154 A | 3/1998 | Jachimowicz et al. | |
| 5,738,945 A | 4/1998 | Lal et al. | |
| 5,739,975 A | 4/1998 | Parks et al. | |
| 5,748,737 A | 5/1998 | Daggar | |
| 5,756,220 A | 5/1998 | Hoshino et al. | |
| 5,763,862 A | 6/1998 | Jachimowicz et al. | |
| 5,770,942 A | 6/1998 | Taguchi et al. | |
| 5,777,306 A | 7/1998 | Masuda | |
| 5,789,733 A | 8/1998 | Jachimowicz et al. | |
| 5,801,368 A | 9/1998 | Hayashi et al. | |
| 5,808,981 A * | 9/1998 | Suzuki | 369/44.28 |
| 5,825,393 A | 10/1998 | Kocznar et al. | |
| 5,828,053 A | 10/1998 | Kinugasa | |
| 5,834,756 A | 11/1998 | Gutman et al. | |
| 5,843,565 A | 12/1998 | Davies et al. | |
| 5,844,218 A | 12/1998 | Kawan et al. | |
| 5,844,230 A | 12/1998 | Lalonde | |
| 5,851,688 A | 12/1998 | Chen et al. | |
| 5,852,289 A | 12/1998 | Masahiko | |
| 5,857,079 A | 1/1999 | Claus et al. | |
| 5,859,419 A | 1/1999 | Wynn | |
| 5,861,220 A | 1/1999 | Coughlin | |
| 5,862,174 A | 1/1999 | Yokota et al. | |
| 5,866,891 A | 2/1999 | Fujimoto et al. | |
| 5,869,823 A | 2/1999 | Bublitz et al. | |
| 5,880,445 A | 3/1999 | Mori et al. | |
| 5,880,454 A | 3/1999 | Monicault | |
| 5,883,377 A | 3/1999 | Chapin, Jr. | |
| 5,884,271 A | 3/1999 | Pitroda | |
| 5,886,333 A | 3/1999 | Miyake | |
| 5,889,273 A | 3/1999 | Goto | |

| | | |
|---|---|---|
| D408,377 S | 4/1999 | Ferchau et al. |
| 5,895,903 A | 4/1999 | Abe et al. |
| 5,895,909 A | 4/1999 | Yoshida |
| 5,898,612 A | 4/1999 | Chen et al. |
| 5,901,012 A | 5/1999 | Ishida et al. |
| 5,901,303 A | 5/1999 | Chew |
| D410,769 S | 6/1999 | Dorizas |
| 5,928,759 A * | 7/1999 | Arita et al. .................. 360/135 |
| 5,939,202 A | 8/1999 | Ataka et al. |
| 5,941,375 A | 8/1999 | Kamens et al. |
| 5,979,774 A | 11/1999 | Urushibata |
| 5,997,042 A | 12/1999 | Blank |
| 6,053,406 A | 4/2000 | Litman |
| D425,876 S | 5/2000 | Maiers et al. |
| 6,079,621 A | 6/2000 | Vardanyan et al. |
| 6,080,476 A * | 6/2000 | Kanbe et al. ................ 324/252 |
| D429,733 S | 8/2000 | Jones et al. |
| 6,116,655 A | 9/2000 | Thouin et al. |
| 6,131,816 A | 10/2000 | Smith, Sr. |
| D436,991 S | 1/2001 | Morgante |
| 6,186,398 B1 | 2/2001 | Kato et al. |
| 6,196,047 B1 | 3/2001 | Carnegie et al. |
| 6,221,508 B1 * | 4/2001 | Kanbe et al. ................ 427/131 |
| 6,238,809 B1 | 5/2001 | Wu et al. |
| 6,250,552 B1 | 6/2001 | Hirasawa |
| 6,254,713 B1 | 7/2001 | Riehle |
| 6,268,919 B1 | 7/2001 | Meeks et al. |
| D447,146 S | 8/2001 | Myers |
| D448,776 S | 10/2001 | Weng et al. |
| 6,301,068 B1 | 10/2001 | Ionescu |
| 6,311,893 B1 | 11/2001 | Liu et al. |
| 6,378,037 B1 | 4/2002 | Hall |
| 6,398,114 B1 | 6/2002 | Nishikawa et al. |
| 6,430,114 B1 | 8/2002 | Wang et al. |
| 6,677,105 B2 | 1/2004 | Wang et al. |

\* cited by examiner

DATA STORAGE CARD HAVING A GLASS SUBSTRATE AND DATA SURFACE REGION AND METHOD FOR USING SAME

CROSS REFERENCE TO RELATED APPLICATIONS

This Application is a Continuation-in-Part of U.S. patent application Ser. No. 09/113,783 filed Jul. 10, 1998, now U.S. Pat. No. 6,131,816, issued on Oct. 17, 2000.

BACKGROUND OF THE INVENTION

1. Field of the Invention

This invention relates to a data card having a substrate and a data surface region and more particularly related to a data card having non-magnetic substrate and data surface region. In the preferred embodiment, the non-magnetic substrate may be a glass substrate or a glass-ceramic substrate and the data surface region comprises a magnetic storage medium.

2. Description of Prior Art

Digital data is stored in many forms. One data storage device uses spinning disks having a magnetic surface containing the digital data. The disks typically spin at a high rate of speed with the various tracks of data accessed by a radially movable data head.

Rotating magnetic memory storage devices generally include two elements namely, a rigid substance having a coating of magnetic media formed on at least one surface thereof. Aluminum alloys have been conventionally used as a substrate material for magnetic memory disks. The present trend is towards smaller disk drives driven by drive motors having less torque as such, it has become necessary to develop thin light-weight rugged disks to replace the standard metal disks formed of an aluminum alloy having a cooling of magnetic media formed thereon.

Several alternatives are known in the art for replacing a standard aluminum alloy metal disk. These alternatives include glass substrates having specifically chemically treated surfaces. Also, glass-ceramic substrates have been developed. The glass-ceramic substrate composition in crystalline phase are controlled to develop specific characteristics of the glass-ceramic which enabling use of the glass-ceramic as a rigid substrate. Glass-ceramic substrate materials may have a polished surface to enhance the lubricity, optimized thermal expansion coefficients and be free of silica, such as quartz. The known glass-ceramic substrate materials are selected to have a bulk thermal expansion which is similar to that for known rigid metal substrates used for magnetic memory disks.

For example, U.S. Pat. No. 5,744,208 discloses a glass-ceramics containing lithium disilicate in tridymite. U.S. Pat. No. 5,789,056 discloses a thin film magnetic disk having a substrate made of glass or comparable rigid material.

Typical magnetic disks utilizing a glass substrate are disclosed in U.S. Pat. Nos. 6,048,466; 5,900,324; 5,824,427; 5,789,056; 5,766,727; 5,744,208; 5,569,518; 5,378,548; and 5,037,515.

It is also known in the art to provide texturing in a predetermined pattern on a substrate the adhesion of magnetic layers to the surface of a disk substrate. Typical texturing techniques and patterns are disclosed in U.S. Pat. Nos. 5,748,421; 5,725,625; 5,626,970; 5,496,606 and 4,996,622.

It is also known in the art to utilize materials other than aluminum alloy or glass for disk substrates. U.S. Pat. No. 5,492,745 discloses disks wherein a non-magnetic substrate can be formed of a metal substrate, glass substrate, ceramic substrate or a resin substrate. Other material such as carbon substrate and s: substrate have been used as disk substrate.

U.S. Pat. Nos. 5,736,262 and 5,352,501 also disclose use of non-magnetic substrates which are textured and/or processed to enhance performance of magnetic recording mediums in formed thereon.

Another type of data storage device is the credit card having a magnet stripe along one surface. However, such cards have limited storage capacity because of the nature of the magnetic stripe and the method of recording data onto the magnetic stripe.

SUMMARY OF THE INVENTION

The present invention is directed to a data system especially suited for use with credit card-type substrates which permits much more data to be written onto and read from the substrate than available with credit cards with conventional magnetic stripes.

The data system includes broadly a substrate, such as a credit card type substrate, and a data unit. The substrate had first and second edges and a data surface region between the edges. The data surface region is preferably plated or sputtered with nickel-cobalt as opposed to conventional credit cards which use ferrous oxide. The data unit include a base supporting several components. A substrate support, which supports the substrate, is mounted to the base for controlled movement along a first path. The first path can be straight or curved. A data head drive is mounted to he base and includes a data head reciprocally movable along a second path. The first in and second paths are generally transverse, typically perpendicular, to one another. The data head includes a data head surface which contacts the data surface region on the substrate. The data unit also includes first and second data head support surfaces positioned along the second path adjacent to the first and second edges of the substrate. The data head surface also contacts the first and second data head support surfaces as the data head moves along the second path.

The data head supports surfaces are preferably coplanar with the data surface region of the substrate. This provides a smooth transition for the data head between the data surface region and the data head support surfaces. The use of the data head support surfaces provides a region for the data head to accelerate and decelerate at each end of a pass over the data surface region so the data head can move over the data surface region at the constant surface speed.

The invention may also include a substrate handler including a substrate feeder, which delivers a substrate to and removes the substrate from the substrate support, and a substrate postioner, which automatically positions the substrate on, and secures the substrate to, the substrate support. The substrate postioner typically includes feed rollers and may also include a cleaner roller to clean the data surface region as the substrate passes through the substrate feeder.

Other features and advantages will appear from the following description in which the preferred embodiments have a been set for the in detail in conjunction with the accompanying drawings.

DESCRIPTION OF THE PREFERRED EMBODIMENTS

BACKGROUND

In the data card of the present invention, it is envisioned that an appropriate non-magnetic substrate may be used for practicing this invention. Typical of such non-magnetic substrates include, but is not limited to, glass substrates, crystallized glass substrates, aluminum substrates, ceramic substrates, carbon substrates, silicon substrates, resin substrate and the like.

In addition, it is further envisioned that in the preferred embodiment substrates formed of ceramic material or glass-ceramic material may be used in practicing this invention.

A ceramic is typically a product made by the baking or firing of a non-metallic mineral, such as tile, cement, plaster refractories and brick. Ceramic coatings comprise a non-metallic, inorganic coating made of sprayed aluminum oxide or of zirconium oxide are a cemented coating of an intermetallic compound such as aluminum disilicide, of essentially crystalline nature, applied as a protective film on metal.

It is known in the art that glass comprises a hard, amorphous, inorganic, usually transparent, brittle substance is made by fusing silicates, sometimes borates and phosphates, with certain basic oxides and then rapidly cooling to prevent crystallization. A glass-ceramic material is a non-magnetic material which is formed of a predetermined composition of glass and ceramic.

It is also known in the art that a substrate for a magnetic disk can be formed of a resin material as disclosed in U.S. Pat. No. 5,492,745.

It is also known in the art that a non-magnetic substrate may be treated, textured or coated with a non-magnetic primer layer enhancing adhesion of the magnetic medium formed thereon.

All the above substrates are well known in the art and have been used in fabrication of magnetic disks used in disk drives.

Glass is known in the art as a hard, amorphous, inorganic, usually transparent, brittle substance made by fusing silicates, sometimes borates and phosphates, with certain basic oxides and then rapidly cooling to prevent crystallization. It is known in the art that glass materials are used as substrates for magnetic disks.

It is also known in the art to form a glass-ceramic material which is a combination of and exhibits characteristics an of both the glass material and ceramic material used to form the glass ceramic material. A glass ceramic material can be uniquely fabricated for use as a disk substrate for utilization in a magnetic memory storage device.

Resin is also known in the art. A resin is defined as any of various solids or semi-solid organic substances exuded from various plants and trees or prepared synthetically. Resins are soluble and ether, alcohol or the like and are non-conducters of electricity.

The data card of the present invention uses a non-magnetic substrate which may be formed of glass, glass ceramic, ceramic, resin, an aluminum substrate or other known material as described above. Such substrates are known in the art and have been used as substrates for disks and data storage applications including magnetic hard disk drives.

When a glass substrate is used as a magnetic recording disk substrate, the surface of the glass substrate is generally subjected to a chemically strengthening process by a low-temperature iron exchange method to improve the shock resistance and vibration resistance. One example of a chemical treatment of the glass substrate is use of a chemically strengthening treatment solution produced an alkaline ion exchange. Typically, chemically strengthening is performed after cutting and polishing of the glass substrate. Conventionally, the polishing is performed on the front and back surfaces of a glass substrate but is not performed to the outer peripheral end surface and inner peripheral end surface.

It is known in the art that glass has excellent physically and chemical durability and that it is sufficiently hard to be fabricated into substrates with a diameter and thickness that are smaller then those of current hard disks. One advantage of utilizing a glass substrate is that a highly accurate plane surface can be formed relatively easily and glass is able to provide for the realization of a higher recording density when a layer of magnetic material is formed thereon. For example, the glass substrate can be fabricated into substantially rectangular shapes and be used as a substrate for a thin film magnetic layer. The combination of a glass substrate having a thin magnetic layer formed thereon can be used for fabricating a data storage region which can be affixed to a plastic or other carrier forming a data card utilizing the teachings of the present invention.

It is also known in the art to texture at least one side of a glass substrate. The textured surface may comprise fine scratches or the like which may extend circumferentially and/or linearly formed on the surface desired to be textured.

In addition, thin glass substrates have been used for magnetic recording disks (hard disks), optical disks, liquid crystal displays and the like. Glass substrates have excellent characteristics such as higher flatness and sheet thinning capability compared with resin substrates and metal substrates. Methods of manufacturing a magnetic recording disks using a in glass substrates is disclosed in U.S. Pat. No. 5,725,625.

Numerous types of glass-ceramic materials may be used for the substrate material such as, i.e., glass ceramics containing chain silicate as the predominately crystal phase and a glass-ceramic containing a sheet silicate as the predominately crystal phase.

Aluminum substrates employed as a non-magnetic substrate for hard disks may be fabricated in several forms such as, i.e., Ni—P plated surface of an aluminum substrate. A variety of disk substrates have been used including NI—P coated aluminum-magnesium, glass, glass ceramic, and glassy carbon. Further, it is also known to use other forms of non-magnetic substrates such as a carbon substrate and a Si substrate.

Figure 1:
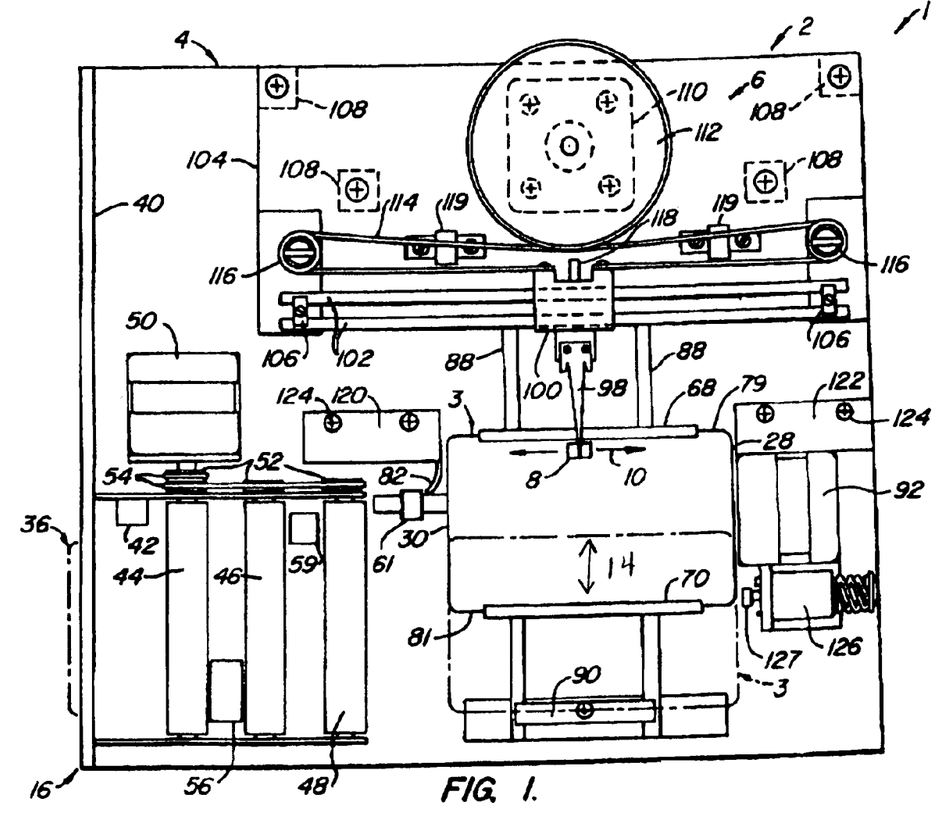
FIG. 1 is a simplified plan view of a data unit made according to the invention.

FIG. 1 illustrates, in a relatively simple schematic form, a data system 1 mad according to the invention. Data system 1 comprises a data unit 2 and a substrate 3; substrate 3 is preferably in the form of a credit card-size card 3. Data unit 2 includes a base, which supports the various other components, a data head driver 6, which drives a data head 8 along a second path 10, a substrate or card support assembly 12, which moves card 3 or another substrate along a first path 14, and a substrate feeder 16, which drives card 3 to and form the substrate support assembly.

Figure 2A:
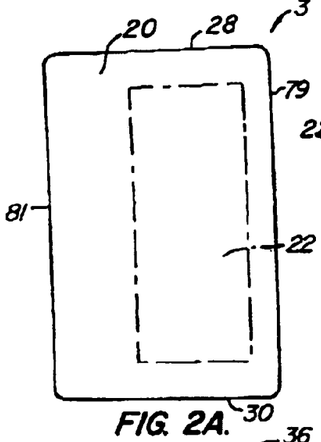
FIGS. 2A, 2B and 2C are front, side and rear elevational views of the substrate of FIG. 1.

Card 3 is preferably a sandwich construction 0.51 mm (0.020 inch) thick ceramic core and upper and lower surfaces made of a suitable plastic material about 0.13 mm (0.005 inch) thick. FIG. 2A illustrates the front or bottom side 20 (relative to the figures) of card 3 having an embossed letter area 22 and a back, data or top side 24 having a data surface region 26 extending between first and second edges 2B, 30 of the card.

Side 24 is also preferable includes a magnetic typically ferrous oxide, stripe 32 similar to that used with conventional credit cards. Data surface region 26 is preferably a magnetic region, and may also include ferrous oxide as a magnetic material. However, because of the use environment, to be discussed below, it is desired that region 26 be smooth and resistant to abrasion. This can be achieved in various conventional ways, such as by sputtering with carbon.

Figures 2B, 2C:
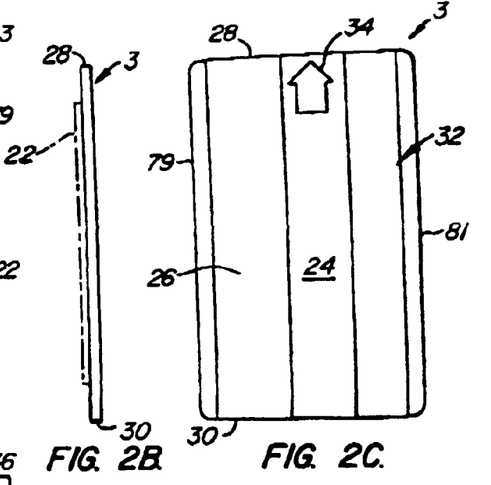
Figure 3:
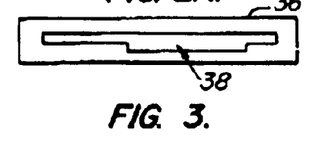
FIG. 3 is a side view illustrating the shape of the opening in the card entry of FIG. 1.

In the preferred embodiment of FIGS. 2A–2C, only a portion of side 24 is covered by data surface region 26. In some embodiment it may be desired to cover most or all of the surface 24 with data surface region 26. A directional arrow 34 may also be included to aid the user in proper insertion of card 3 into card entry 36 shown in FIGS. 1, 3, 4A and 4B. As illustrated in FIG. 3, the opening 38 in card entry 36 had an enlarged portion to accommodate embossed letter area 22 shown in FIGS. 2A and 2B.

Figure 4A:
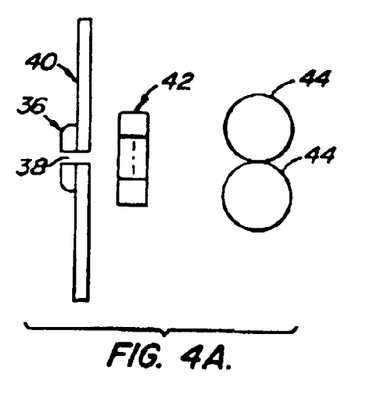
FIG. 4A is a simplified schematic view illustrating the card entry, card sensor and first feed rollers of the substrate feeder of FIG. 1.
Figure 4B:
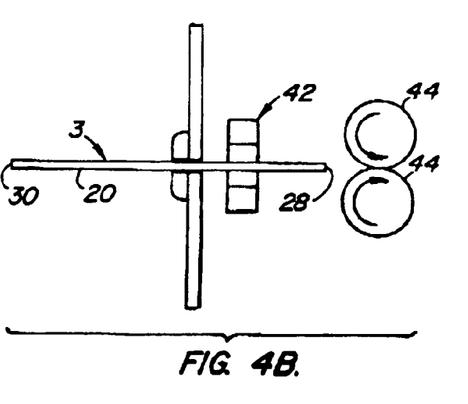
FIG. 4B illustrates the components of FIG. 4A with a card being inserted through the card entry and through the card sensor, which activates the first feed rollers which will then grip the card as the user continues to insert the card through the card entry.

FIGS. 4A and 4B illustrate a portion of substrate feeder 16, including card entry 36 mounted to the front panel 40 of data unit 2. The user begins the read/write process by inserting a card 3 into opening 38 of card entry 36 sufficiently far to trip a light beam in a card sensor 42 which causes three sets of feed rollers 44, 46, and 48 to begin rotating as indicated by the arrows in FIGS. 4B and 5D. Feed rollers 44, 46, and 48 are driven by a feed system motor 50 through various pulleys 52 and belts 54. Once the user pushes card 3 far enough into unit 2 so that the first edge 28 of card 3 is captured that he nip of rollers 44, the feed rollers automatically move card 3 thorough substrate feeder 16 as suggested by FIGS. 5A–7A.

Figure 5A:
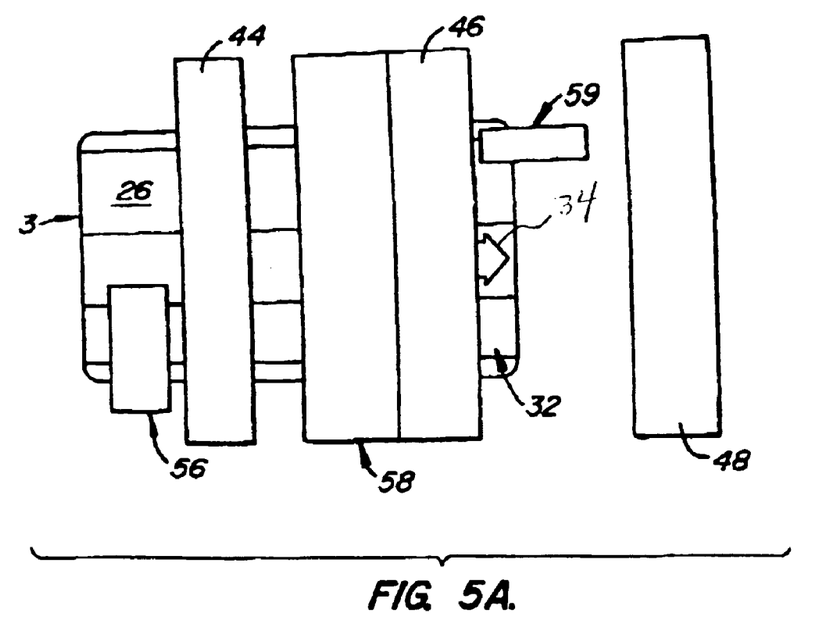
FIGS. 5A and 5b are top plan and side elevational views of a portion of the substrate feeder of FIG. 1, but also illustrating a counter-rotating cleaning roller, not showing in FIG. 1 for clarity, with the card engaged by the first and second sets of feed rollers and the upper surface of the card being cleaned by the counter-rotating cleaning roller.
Figure 5B:
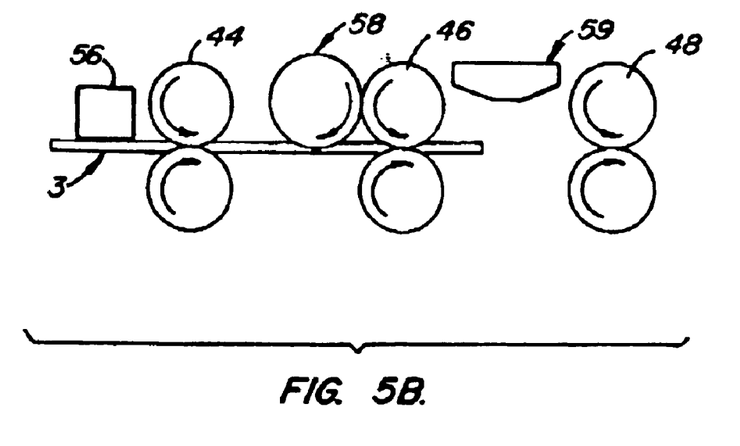

FIGS. 1, 5A and 5B illustrate the use of a magnetic stripe reader 56 which reads, in a conventional fashion, any information on magnetic stripe 32 as appropriate. Substrate feeder 16 also includes a counter-rotating cleaning roller 58. Cleaning roller 53 is not shown in FIG. 1 for clarity. Cleaning roller 58 is used to ensure that data surface region 26 is clean of particles and debris prior to being accessed by data head 8. Substrate feeder 16 also includes a reflective sensor 54 which senses the presence of data surface region 26. If card 3 has no data surface region 26, then feed rollers 44, 46 reverse the direction of card 3 and return it to the user with only magnetic stripe 32 having been read by magnetic stripe reader 56. Assuming card 3 includes a data surface region 26, feed rollers 44, 46, 48 continue the movement of card 3 past optical sensor 61 and towards card support 60 of card support assembly 12.

Figure 6A:
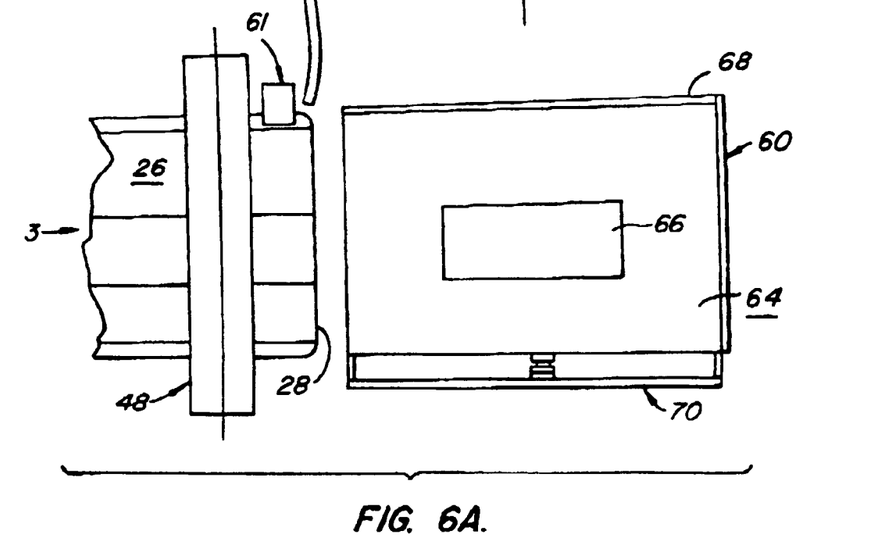
FIGS. 6A and 6b illustrate movement of the card between the third feed rollers, past a sensor and towards the card support of the card support assembly of FIG. 1.
Figure 6B:
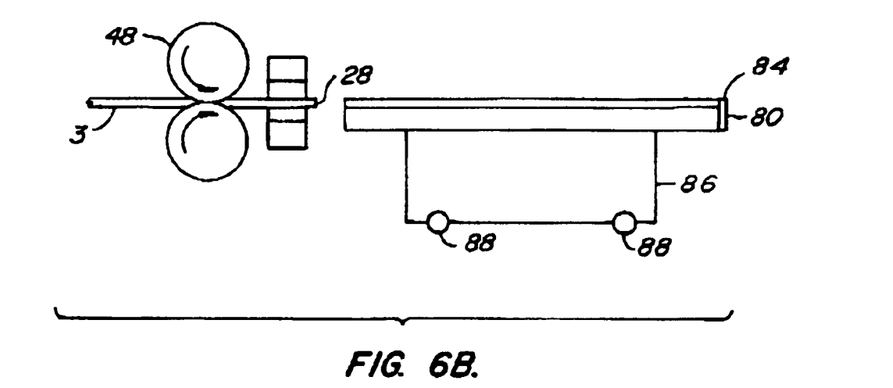
Figure 7A:
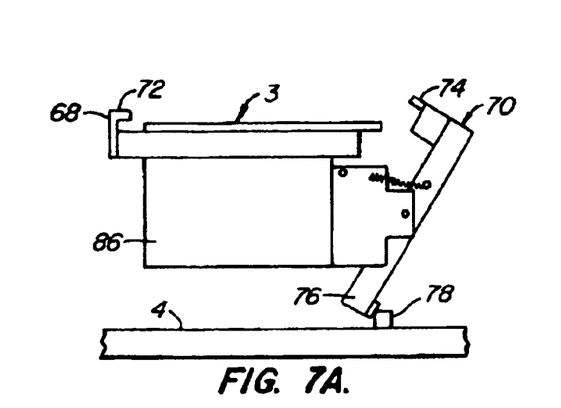
FIG. 7A is a simplified view illustrating the engagement of the bottom of a movable side registration member with a stud extending from the base when a card carriage, on which the card support is mounted, is at the load/unload position, the load/unload position being indicated by the card in dashed lines in FIG. 1.
Figure 7B:
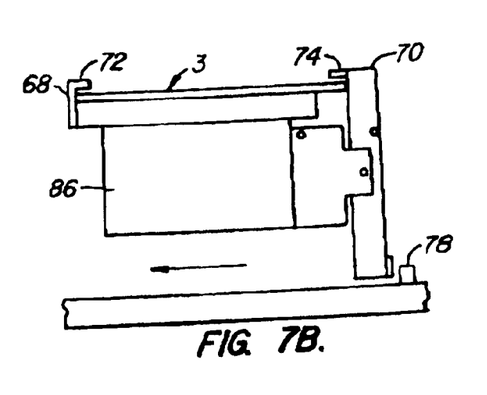
FIG. 7B illustrates the release of the movable side registration member as the carriage begins to move away from the load/unload position towards the solid line position of FIG. 1, thus capturing the third and fourth edges of the card between the movable and stationary side registration members.
Figure 9A:
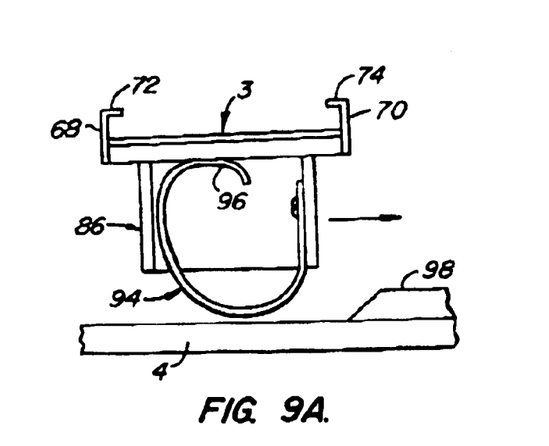
FIGS. 9A and 9B illustrate the movement of a vertically deflection spring which engages the bottom of the card as the carriage moves towards the solid line position of FIG. 1, thus securing the card against the inwardly extending lips of the stationary and movable side registration members.
Figure 9B:
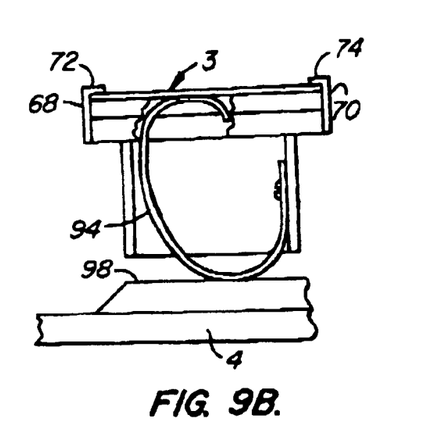

One end 62 of card support 60 is open to permit the free entry of card 3 onto the card support surface 64 of the card support. Card support surface 64 has an opening 66 formed through the middle of the surface as will be described below with reference to FIGS. 9A and 9B. Referring now also to FIGS. 7A and 7B, card support 60 is seen to include a stationary side registration member 68 and a movable side registration member 70. Members 68 and 70 have overhanging lips 72, 74. When card support 60 is in the load/unload position of FIGS. 6A, 68 and 7A, which corresponds to the dashed-line positions of card 3 in FIG. 1, movable side registration member 70 is pivoted to its position of FIG. 7A by the engagement of the lower end 76 of member 70 with a stationary stud 78 extending upwardly form base 4. This permits card 3 to be freely driven onto surface 64 of card support 60 between registration members 68, 70. The initial movement of assembly 12 along path 14 towards data head driver 6 causes registration member 70 to engage a fourth edge 81 of card 3 and drive the third edge 79 o the card against registration member 68.

Figure 8A:
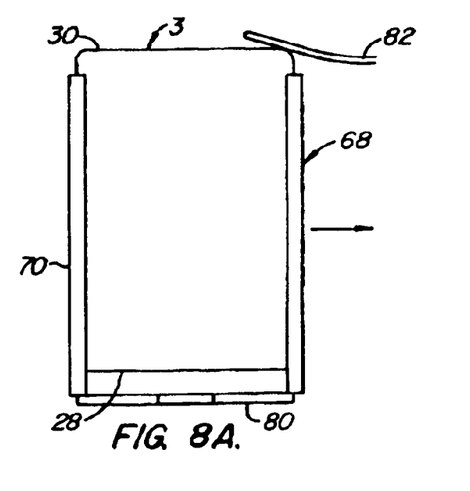
FIGS. 8A and 8B are plan views of the card support and card showing how the card guide of FIGS. 1 and 6A deflects the card into its fully loaded position as the carriage moves towards the solid line position of FIG. 1.
Figure 8B:
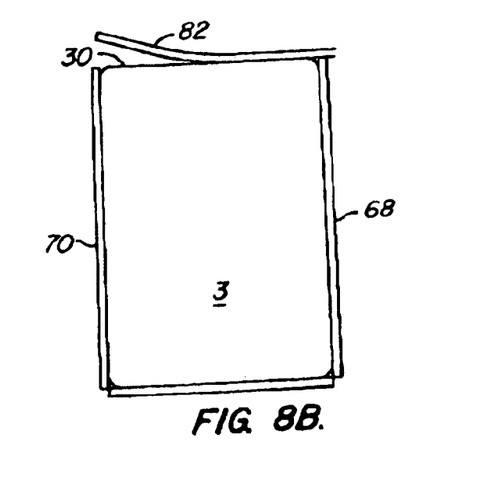

First edge 29 of card 3 is driven against abutment edge 80 of card support 60 by the movement of card support 60 along the first path 14 towards data head driver 6, that is from the dashed-line position to the solid-line position of FIG. 1. Such movement along first path 14 causes second edge 30 of card 3 to engage an angled card guide 82 which drives card 3 fully onto card support 60 as shown in FIGS. 8A and 8B. Abutment edge 80 is sized so that its upper edge 84, see FIG. 6B, is slightly below, such as 0.38 mm (0.015 inch) below the top surface 24 of card 3 when the card is pressed upwardly to engage lips 72, 74 of members 68, 70 in the manner discussed below.

Card support 60 is mounted to and is carried by the carriage 86, the carriage being slidable along a pair of guide shafts 88, the guide shafts being supported on base 4 by shaft clamps 80, only one of which is shown in FIG. 1. Carriage 86, and thus card support 60 with card 3 thereon, is driven along first path 14 by a carriage motor 92.

The vertical movement or indexing of card 3 is achieved by the use of a C-shaped spring 94 mounted to the interior of carriage 86. An upper end 96 of spring 94 is aligned with and passes through opening 66 formed in card support surface 64 and illustrated in FIG. 6A. As carriage 86 moves along first path 14 from the load/unload position corresponding to he dashed-line position of FIG. 1, towards data head driver 6, sprint 94 rides up onto a cam 98 extending upwardly from base 4. This causes card 3 to be biased upwardly against lips 72, 74 and held in place against inadvertent movement during read/write operations.

Returning again to FIG. 1, card 3 is shown with data head 9 at track "000" position. Data head 9 is preferably of the magnetic head contact-type which contacts data surface region as data head 8 is move along second path 10. Data head 8 is mounted to the distal end of an arm 98 which is mounted to a head carriage 100. Head carriage 100 is slidably mounted to a pair of guide shafts 102, the guide shafts mounted to a motor mount plate 104 by a pair of shaft clamps 106. Motor mount plate 104 is adjustably mounted to base 4 by four spacer mounts 108. Data head driver 6 also includes a read/write head motor 110 which drives a pulley 112 in alternating clockwise and counter-clockwise directions. Pulley 112 is coupled to carriage 100 by a drive band 114 which passes around a pair of roller bearings 116 as well as pulley 112.

The position of data head 8 relative to data surface region 18 is provided by the rotary position of pulley 112 and by a sensor interrupter 118 being sensed by a pair of sensors 119. Sensors 119 are generally aligned with edges 28, 30 of card 3 when the card is in the read/write position of FIG. 1.

Second path 10 extends beyond first and second edges 2, 30 onto data head support surfaces 120, 122. Data head support surfaces 120, 122 are generally coplanar with data surface region 18 so that data head 8 moves smoothly form region 1 onto support surfaces 120, 122 are generally coplanar with data surface region 18 so that data head 8 moves smoothly from region 18 onto support surface 120, 122. The use of support surfaces 120, 122 permits data head 8 to move across data surface region 18 onto support surfaces 120, 122. The use of support surfaces 120, 122 permits data head 8 to move across data surface region 118 at full speed. Preferably, data head 8 slows down, stops, reverses direction, and then speeds up for each subsequent pass while on one of data surfaces 120, 122. During this deceleration, stopping, reversal of direction, and acceleration, carriage motor 92 has a chance to index card 3 one track width along first path 14. Therefore, by the time data head 8 is ready to reengage data surface region 18, the next track, which may or may not be the adjacent track, is aligned with second path 10 and thus can be read by or written to by data head 8. Data head support surface 120, 122 are preferably low friction, low abrasion surfaces suitable for the sliding movement of data head 8 thereover. To ensure proper alignment, each data surface 120 is preferably provided with appropriate height adjusters 124 is preferably provided with appropriate height adjusters 124. The gap between surfaces 120, 122 and card 3 is preferably small enough so that data head 8 traverses the gap smoothly. If necessary support at the gap can be provided by, for example, a small jet of air.

Figure 10:
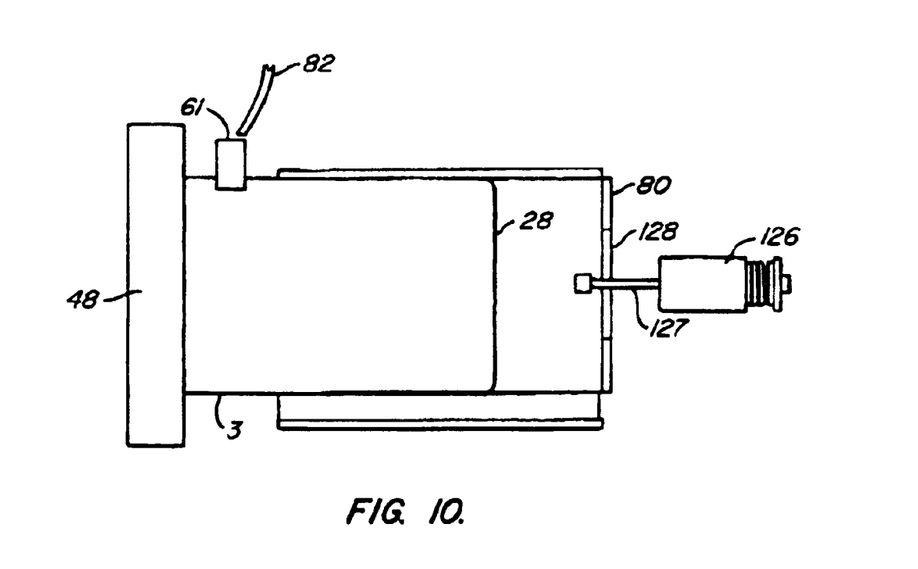
FIG. 10 illustrates the extension of the plush solenoid of FIG. 1 used to cause the card to reengage with the third feed rollers once the card is returned to the load/unload of FIG. 7A position after a read/write procedure has been conducted.

Data head 8 is preferably at the rest position on data head support surface 120 or data head support surface 122 when card 3 is moved form a dashed-line to the solid-line positions of FIG. 1. This keeps data head 8 from contacting side registration member 68 during such movement. At the completion of read/write operations, carriage 86 moves tot he load/unload position of FIGS. 7A and 10 whereupon a push solenoid 126 is actuated, see FIG. 10, to push card 3 until the card is captured between third feed rollers 48. Push solenoid 126 has a plunger 127 which passes through a gap 128 in abutment edge 80 to engage first edge 28 of card 3. Feed rollers 44, 46 and 48, all rotating in the opposite direction indicated in FIG. 5B, drive card 3 back through opening 38 in card entry 36 to about he position of FIG. 4B.

In use, a user inserts a card 3 through opening 38 in card entry 36 whereupon substrate reader 16 drives it past magnetic stripe reader 56 and to reflective sensor 59. Assuming reflective sensor 59 senses the presence of data surface region 26, rollers 46, 48 continue driving card 3 towards substrate support assembly 12. After card 3 has passed third feed rollers 48, the inertia of the card causes the card to continue moving onto support surface 64 of card support 60. To ensure first edge 28 of card 3 abuts abutment edge 80 of card support 60, a card guide 82 is used to engage second edge 30 as card 3 moves from the load/unload position of FIG. 7A, that is the dash line position of FIG. 1, to the read/write position, that is the solid line position of FIG. 7A, that is the dash line position of FIG. 1, to the read/write position, that is the solid line position of FIG. 1. Third edge 79 of card 3 is driven against stationary side registration member 68 by the pivotal movement of spring biased side registration member 70 during the initial movement of the card from the dashed position toward the solid-line position of FIG. 1. Continued movement of card 3 toward the solid-lien position of FIG. 1 causes spring 94 to be biased upwardly to drive card 3 upwardly until the lateral edges 79, 81 of the card engage lips 72, 74 of registration members 68, 70.

Once in the initial read/write position of FIG. 1, motor drives data head 9 from one of data head support surfaces 120, 122 and data surface region 26 of card 3. In the preferred embodiment, motor 110 is designed to cause data head 8 to reach its desired speed of, for example, 318 cm per second 125 inches per second) by the time data head 9 reaches card 3. It is desired that information on data surface region 26 be written at the rate of 36,000 bits per inch or greater. The density of the recording is determined by several factors, including the uniformity in movement at which data head 8 passes over region 26, the construction of head 8, the construction of data surface region 6, the frequency of the read/write clock, and other conventional factors.

At the end of each pass, while data head 8 is moving over data head support surface 24 during its deceleration, stopping, reversal of direction, and acceleration, card 3 is indexed tot he next track position to be accessed. If desired, the accessing of the track sequential or particular tracks can be selected, such as track 000, followed by track 023, followed by track 085, followed by track 085, followed by track 031, etc. The organization of the data recorded on data surface region 26 is dependent largely by the controller selected. The controller for unit 2 may be of a conventional type, such as one made by Realtec of San Diego, Calif. and sold as product number TCNGE09. In one embodiment, 350 tracks, each track having 56 sectors with 256 bytes per sector for a total 5,017,600 bytes, will be sued.

When it is desired to remove card 3 from the unit data head 8 is parked on one of the two support surfaces 120, 122 and then motor 92 drives carriage 86 back to the load/unload position at which point push solenoid 126 is actuated. Plunger 127, which passes through gap 128 in abutment edge 80, pushes card 3 until card 3 is engaged by third rollers 48, at this time being rotated in directions opposite of the directions of FIGS. 5B and 6B. Card 3 is then delivered to the user in substantially the position as indicated in FIG. 4B.

In the preferred embodiment data head 8 physically contact data surface region 26 and support surfaces 120, 122. It may be possible to use a so-called flying head in which data head a would not contact data surface region 26. However, it is believed that the gaps at edges 28, 30 would create turbulence causing the flying head to crash onto data surface region 26. Also, the invention has been described with reference to magnetic, digitally encoded data. If desired, the data could be analog in nature and could be optical or magneto optical in character.

Figure 11:
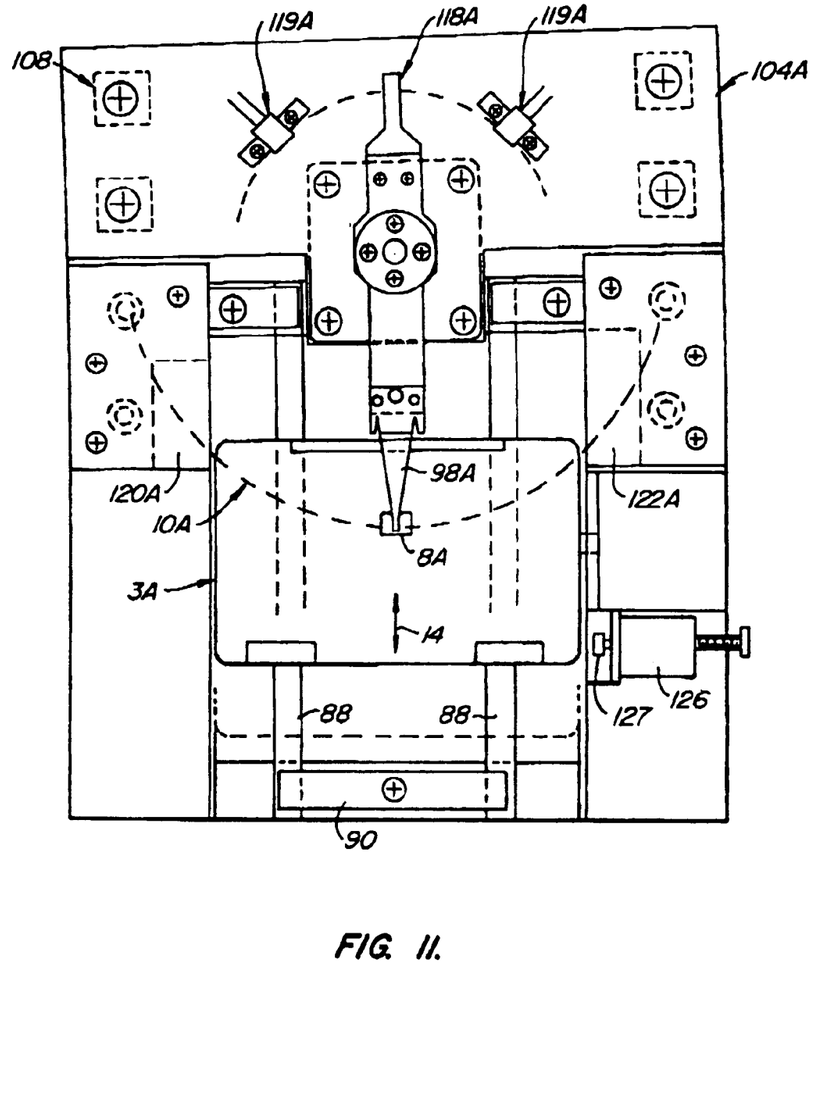
FIG. 11 is a simplified top plan view of a portion of an alternative embodiment of the invention in which the data head is mounted to the end of a pivotal arm which causes the read/write head to pass along an arcuate second path as opposed to the linear second path of the embodiment of FIG. 1.

FIG. 11 illustrates portions of an alternative embodiment of the invention with like reference numerals referring to like elements. In this case, data unit 2A uses an oscillating data head 8A which passes along an arcuate second path 10A. Data head support surfaces 120A, 122A are positioned somewhat differently, but proved the same service: support of data head 8A at each end of its movement. Sensors 119A indicate when data head 8 has passed form data surface region 26A so that data head 8 can begin its deceleration and reverse acceleration movement as card 3A is indexed along first path 14.

Other modifications and variation can be made to the disclosed embodiments without departing from the subject of the invention as defined in the following claims for example, cleaning roller 58 could be replaced by or supplemented by an air vacuum head or a pressurized air nozzle to remove debris from data surface region 26.

It is envisioned that the data card of the present invention would comprise a substrate having first and second edges in a data surface region therebetween. The substrate will include at least one layer comprising a non-magnetic material which is adapted to be relatively rigid and which is to have a magnetic media formed directly on the surface thereof. The non-magnetic material for the substrate may be selected from the group of a metal substrate, a glass substrate, a ceramic substrate, a glass-ceramic substrate and a resin substrate. The substrate may be formed of an at least one layer acting as a single layer or may have outer layers mounted thereto.

A method for reading a data card with a card reader may be used for practicing the invention. The method will include the steps of forming a substrate for a data card having first and second edges and surface region therebetween wherein the substrate includes at least one layer comprising a non-magnetic ceramic material which is adapted to interact with a data processing station when said card and said data processing station are moved relative to each other to at least one of write encoding signals in said data surface section as encoded signals and read encoded signals from said data surface section; and moving said substrate and data processing station relative to each other to interface said data surface region relative to a transducer to enable data flow therebetween.

In addition, a method for reading a data card with a card reader using the teachings of the present invention it is disclosed. The method includes the steps of forming a substrate for a data card having first and second edges and a data surface section location therebetween wherein the substrate includes at least one layer comprising a non-magnetic material selected from the group of a metal substrate, a glass substrate, a ceramic substrate a glass-ceramic substrate and a resin substrate and wherein said data surface region includes a magnetic material for storing data; and moving said data card and data processing station relative to each other to interface said data storage section relative to a transducer to enable data flow therebetween.

It is also within the teaching of the present invention that the surface of the non-magnetic substrate material can be processed, textured or otherwise treated to enhance the adhesion of a magnetic media, such as a nickel-cobalt recording layer.

The data card may be in the form of a variety of shapes such as generally rectangular, rectangular, square, circular or a rotatable circular disk member within a data card housing.

A card and card writer/reader system is disclosed which comprises a magnetically encodeable card having a body having upper and lower surfaces and side and end edges. The body includes on at least one of the upper and lower surfaces a data storage device adapted to interact with a data processing station when the card and the data processing station are moved relative to each other. The data storage device includes at least one thin film layer of high density, high coercivity magnetic material having a predetermined magnetic field orientation for storing data. A first transducer is used for reading the magnetically encoded signals from the data storage device during relative movement of the card relative to the data processing station to enable data flow between the data storage in device and the transducer. A second transducer is used for writing magnetically encoding signals in the data storage device as magnetically encoded signals during relative movement of the card relative to the data processing station to enable data flow between the data storage device and the transducer.

The transducer is may be an inductive head or a thin film magnetic head.

A method is disclosed for reading a card with a card reader comprising the steps of forming on a glass substrate of a card a data storage section a data surface region comprising a magnetic storage medium having at least one layer of high density, high coercivity magnetic material for storing magnetic signals adapted to interact with a data processing station when the card and the data processing station are moved relative to each other to at least one of write encoding signals in the data storage section as encoded signals and read encoded signals from the data storage section; and moving the card and data processing station relative to each other to interface the data storage section relative to a transducer to enable data flow therebetween.

What is claimed is:

1. A data communication method comprising:
   providing a data card including a magnetic material;
   inserting the data card into a data unit, wherein the data unit includes a data head operable to communicate signals with the magnetic material of the data card;
   moving the data card in a linear first direction through the data unit to a first position;
   moving the data card along a first path from the first position toward the data head;
   communicating signals between the data head and the magnetic material while holding the data card stationary and moving the data head along a second path parallel to the first direction and perpendicular to the second path.

2. The method of claim 1, further comprising cleaning the data card within the data unit.

3. A data communication method comprising:

providing a data card including a magnetic material;

inserting the data card into a data unit, wherein the data unit includes a data head operable to communicate signals with the magnetic material of the data card;

moving the data card in a linear first direction through the data unit;

communicating signals between the data head and the magnetic material while moving the data head in a linear manner along a first track parallel to the first direction.

4. The method of claim 3, wherein the linear movement of the data card in the first direction is stopped upon reaching a first position, and further comprising:

moving the data card linearly from the first position toward the data head prior to the step of communicating signals.

5. The method of claim 3, further comprising indexing the data card after communicating signals along the first track, and then communicating signals between the data head and the magnetic material while moving the data head in a linear manner along a second track parallel to the first track.

6. The method of claim 5, wherein the data card is indexed in a direction perpendicular to the first track.

7. The method of claim 6, wherein the data unit includes a data head support surface positioned adjacent the first edge of the data card during the communication of signals, wherein the data head is positioned over the data support surface during the indexing of the data card.

8. The method of claim 5, wherein after communicating signals along the first track, but before communicating signals along the second track, the data head is moved beyond a first edge of the data card.

9. The method of claim 3, further comprising communicating signals between the data head and the magnetic material while moving the data head in a linear manner along a second track parallel to the first track.

10. The method of claim 3, wherein the magnetic material is on an exterior surface of the data card.

11. The method of claim 3, wherein the data head contacts the magnetic material during the communicating of the signals.

12. The method of claim 3, wherein the data head is a flying head that does not contact the magnetic material during the communicating of the signals.

13. A data communication method comprising:

providing a rectangular data card comprising magnetic material;

inserting the data card into a data unit, wherein the data unit includes a data head operable to communicate signals with the magnetic material of the data card; and communicating signals between the data head and the magnetic material while moving the data head in a linear manner along a first data track, and subsequently communicating signals between the data head and the magnetic material while moving the data head in a linear manner along a second data track, wherein the first and second data tracks are parallel data tracks.

14. The method of claim 13, wherein between the moving of the data head along the first and second data tracks, the data card is repositioned.

15. The method of claim 13, wherein the magnetic material is on an exterior surface of the data card.

16. The method of claim 13, wherein the data head contacts the magnetic material during the communicating of the signals.

17. The method of claim 13, wherein the data head is a flying head that does not contact the magnetic material during the communicating of the signals.

* * * * *